(12) United States Patent
Erceg et al.

(10) Patent No.: US 9,698,945 B2
(45) Date of Patent: Jul. 4, 2017

(54) LONG-TERM EVOLUTION UNLICENSED (LTE-U) AND WIRELESS LOCAL AREA NETWORK (WLAN) COEXISTENCE MECHANISM

(71) Applicant: Avago Technologies General IP (Singapore) Pte. Ltd., Singapore (SG)

(72) Inventors: Vinko Erceg, Cardiff, CA (US); Matthew Fischer, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 110 days.

(21) Appl. No.: 14/526,091

(22) Filed: Oct. 28, 2014

(65) Prior Publication Data

US 2016/0094317 A1    Mar. 31, 2016

Related U.S. Application Data

(60) Provisional application No. 62/057,845, filed on Sep. 30, 2014.

(51) Int. Cl.
| | |
|---|---|
| *H04L 5/00* | (2006.01) |
| *H04W 84/12* | (2009.01) |
| *H04W 16/14* | (2009.01) |
| *H04W 52/02* | (2009.01) |
| *H04W 72/00* | (2009.01) |

(52) U.S. Cl.
CPC .......... *H04L 5/0007* (2013.01); *H04W 16/14* (2013.01); *H04W 52/0206* (2013.01); *H04W 72/00* (2013.01); *H04W 84/12* (2013.01)

(58) Field of Classification Search
CPC ............. H04B 1/715; H04B 2001/7154; H04J 11/0023; H04L 5/001; H04L 5/0007; H04L 5/0005; H04L 5/0012; H04L 5/0032; H04L 5/0073; H04L 27/0006; H04L 5/14; H04L 5/0062; H04W 16/04; H04W 16/14; H04W 24/08; H04W 28/085; H04W 48/10; H04W 56/00; H04W 72/00; H04W 72/005; H04W 72/082; H04W 72/0426; H04W 72/0453; H04W 80/00; H04W 84/12; H04W 84/12; H04W 52/0206; H04W 88/06
See application file for complete search history.

(56) References Cited

U.S. PATENT DOCUMENTS

| | | | |
|---|---|---|---|
| 2005/0207381 A1* | 9/2005 | Aljadeff | H04W 4/02 370/338 |
| 2012/0076081 A1* | 3/2012 | Merlin | H04W 74/0816 370/329 |

(Continued)

*Primary Examiner* — Alpus H Hsu
*Assistant Examiner* — Dharmesh Patel
(74) *Attorney, Agent, or Firm* — Foley & Lardner LLP

(57) ABSTRACT

In some aspects, the disclosure is directed to methods and systems for protocol coexistence. Within a frequency band of a wireless local area network (WLAN), a device implemented for operation in at least a non-WLAN protocol can determine that the frequency band is quiet at a first time instance. The device can transmit a message in WLAN protocol responsive to the determination and prior to operation in the non-WLAN protocol within the frequency band. The message can have a receiver address other than an address belonging to other devices operating within the frequency band.

20 Claims, 6 Drawing Sheets

(56) References Cited

U.S. PATENT DOCUMENTS

2013/0208587 A1\* 8/2013 Bala .................. H04W 16/14
370/230
2015/0215100 A1\* 7/2015 Jeon .................. H04L 5/0062
370/252

\* cited by examiner

LONG-TERM EVOLUTION UNLICENSED (LTE-U) AND WIRELESS LOCAL AREA NETWORK (WLAN) COEXISTENCE MECHANISM

CROSS REFERENCE TO RELATED APPLICATIONS

This application claims priority to and the benefit of U.S. Provisional Application No. 62/057,845, filed Sep. 30, 2014, entitled "LONG-TERM EVOLUTION UNLICENSED (LTE-U) AND WIRELESS LOCAL AREA NETWORK (WLAN) COEXISTENCE MECHANISM", assigned to the assignee of this application, and which is incorporated herein by reference in its entirety for all purposes.

FIELD OF THE DISCLOSURE

This disclosure generally relates to systems and methods for improving transmission links of a communications system, including but not limited to systems and methods for communications protocol coexistence.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, updates and new standards are constantly being developed for adoption, such those associated with the third generation partnership project (3GPP) and IEEE 802.11.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s)) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); 3GPP; and IEEE 802.11. Although this disclosure can reference aspects of these standard(s) and specification(s), the disclosure is in no way limited to these aspects. Various embodiments of these standard(s) and specification(s), such as LTE-U, sometimes referred to as licensed-assisted access (LLA) LTE, are within the scope of the disclosure.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for LTE-U and WLAN coexistence.

A. Computing and Network Environment

Figure 1A:
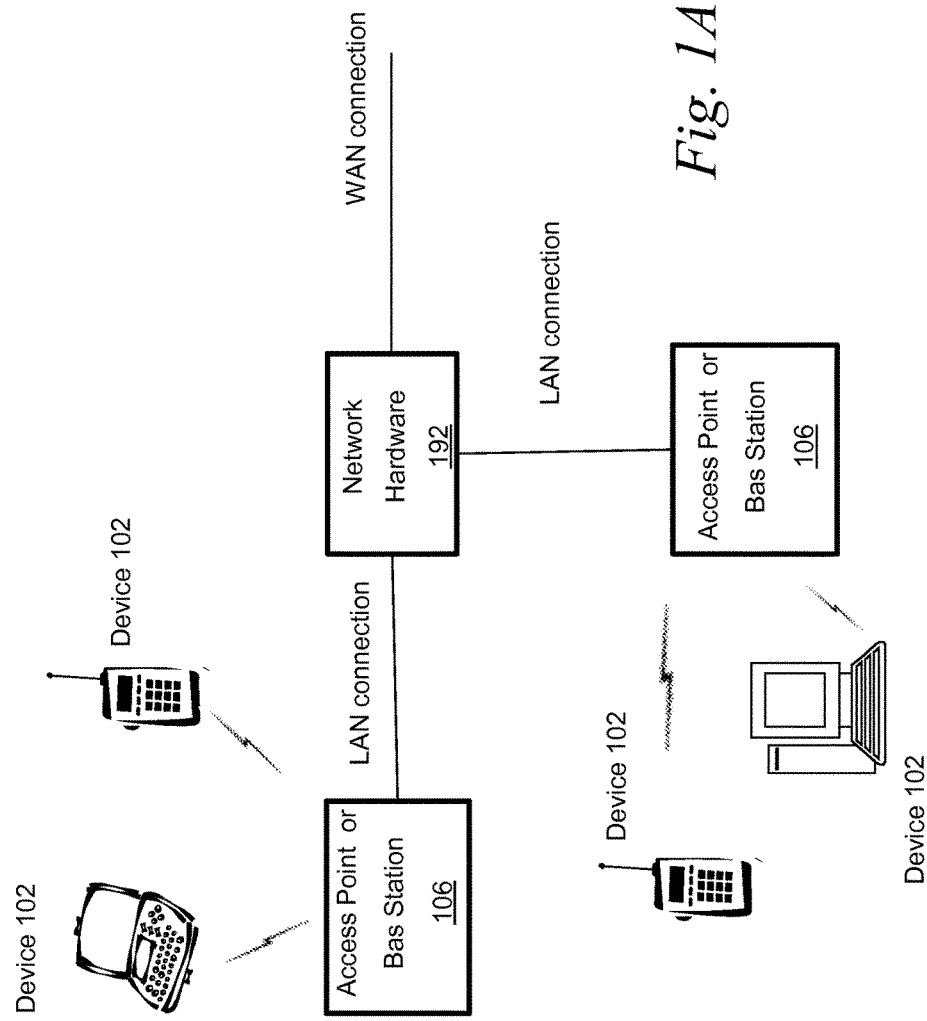
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B." "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
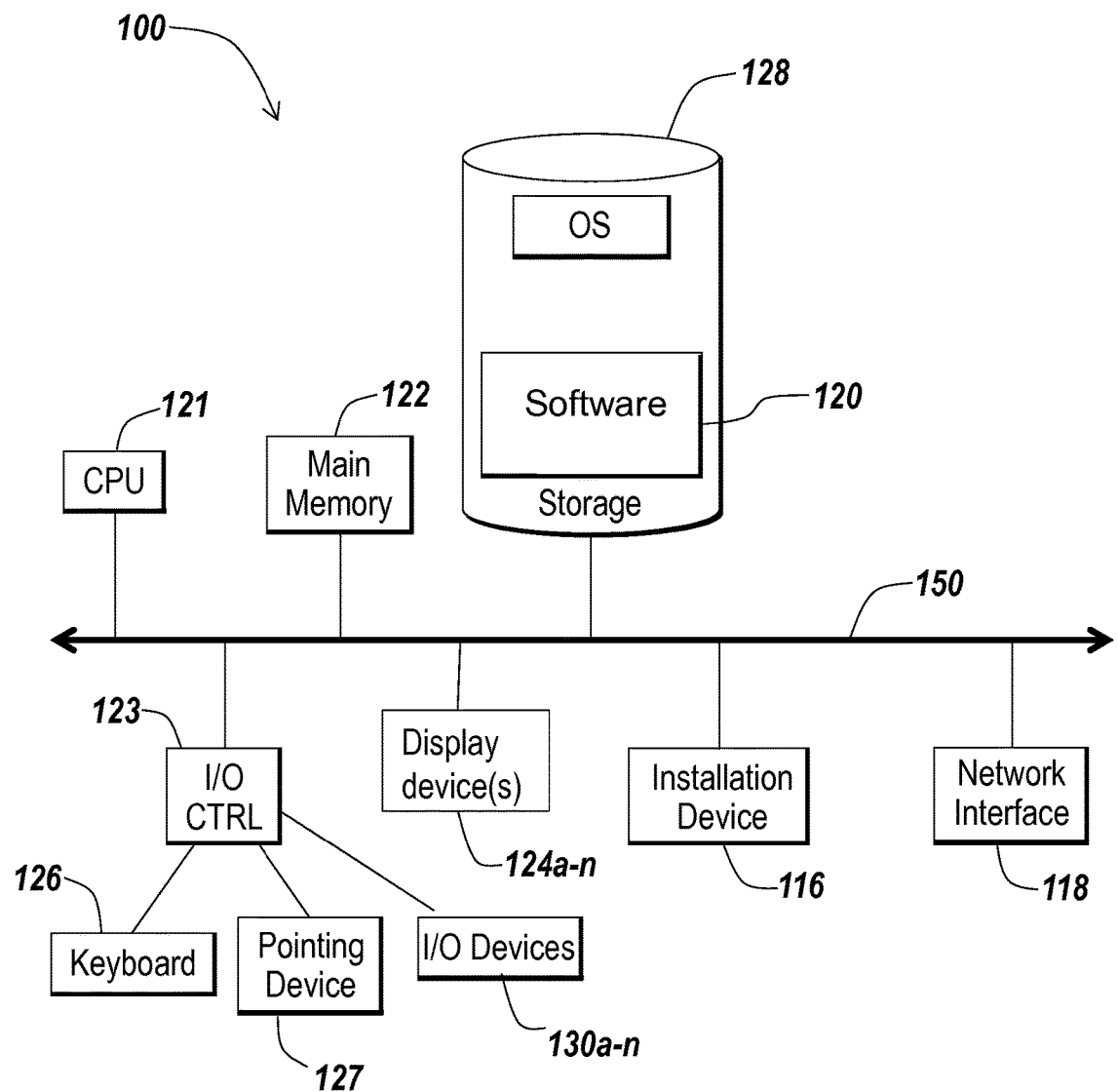
FIGS. 1B and 1C are block diagrams depicting embodiments of computing devices useful in connection with the methods and systems described herein.
Figure 1C:
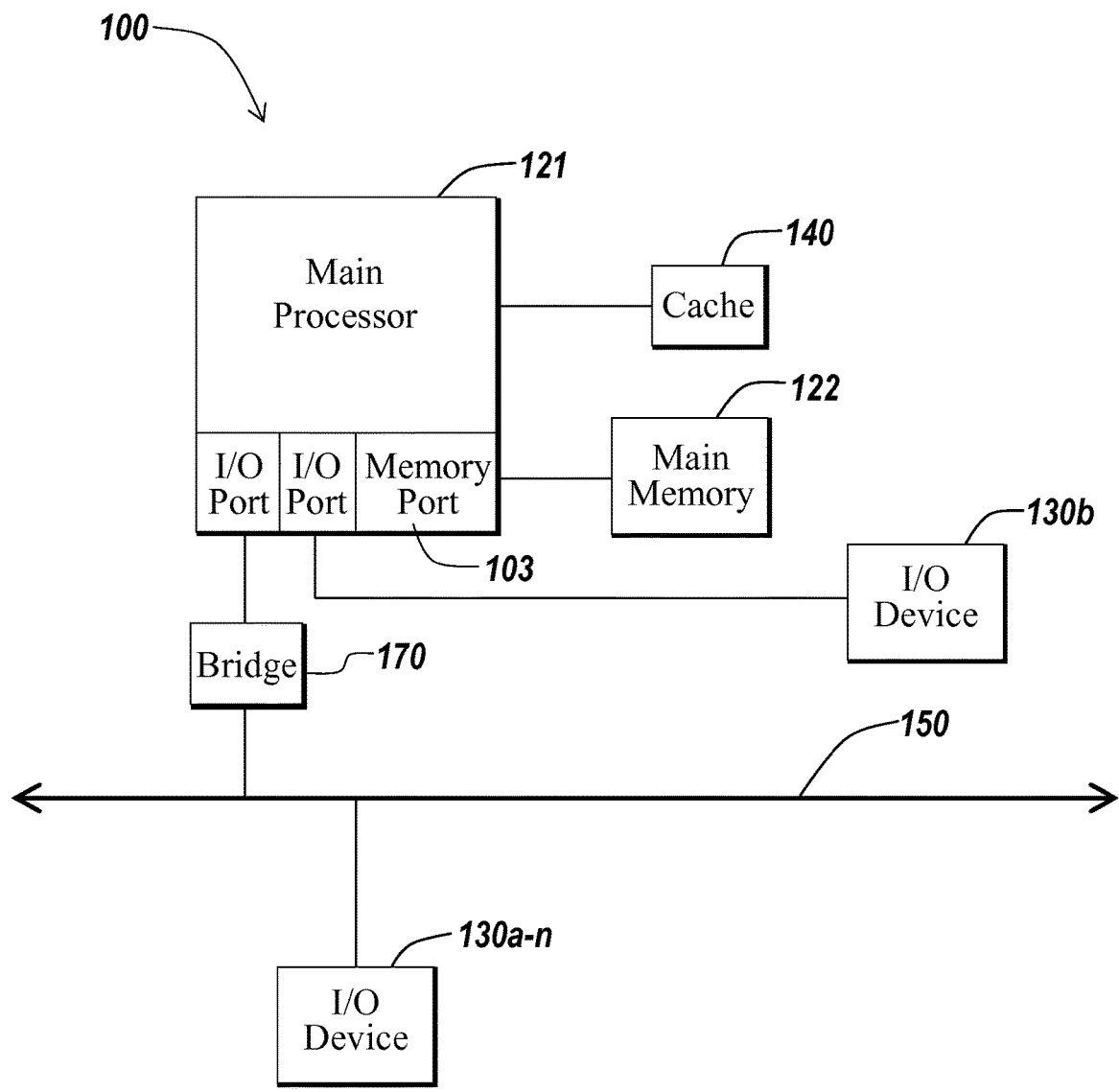

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. LTE-U and WLAN Coexistence Mechanism

Described herein are systems and methods for co-existence of LTE-U and WLAN operation across devices operating within a WLAN frequency band. WLAN frequency bands are as yet unlicensed for use by LTE devices. Hence, coordination between LTE and WLAN operation is desired if LTE devices are to operate in the same frequency bands. LTE-U is sometimes referred to as LLA LTE, LLA using LTE, LLA, or LTE over unlicensed, and any of these terms may be used interchangeably in this disclosure.

In one or more embodiments, to introduce a LTE-U or non-WLAN device into a WLAN frequency band, the device sends a WLAN or 802.11 message to quiet the WLAN medium for a duration of time before the device begins to transmit in a non-WLAN mode. In one or more embodiments, before actually sending this WLAN/802.11 message, the device uses a mechanism, such as energy detection or RTS-CTS, to check whether the time is appropriate to send the message. This check avoids collision with other WLAN messages in one or more embodiments. When WLAN devices in the area successfully detect the message and ascertain that they are not addressed or identified in the message, these devices can refrain from operation for a duration of time specified in the message, in one or more embodiments. This allows the non-WLAN device to operate in the WLAN frequency band without interference from the WLAN devices for the specified duration of time in one or more embodiments.

In one or more embodiments, the disclosure is directed to a method for protocol coexistence. In one or more embodiments, within a frequency band of a wireless local area network (WLAN), a device implemented for operation in at least a non-WLAN protocol can determine that the frequency band is quiet at a first time instance. The device transmits a message in WLAN protocol responsive to the determination and prior to operation in the non-WLAN protocol within the frequency band in one or more embodiments. The message has a receiver address other than an address belonging to other devices operating within the frequency band in one or more embodiments.

In one or more embodiments, the device is or incorporates a long term evolution (LTE) device. The device determines that at least one WLAN device is operating within the frequency band at a time instance prior to the first time instance, and determines to delay transmission of the message in WLAN protocol in one or more embodiments. The device retrieves, from a storage module of the non-WLAN device, the message in WLAN protocol in one or more embodiments. In one or more embodiments, the message in WLAN protocol includes a clear to send (CTS) message, a request to send (RTS) message, a quality of service message, a management message, or a control message. The receiver address includes at least one of: an address of the non-WLAN device, an address with a local bit that is set, a value other than an address belonging to any of the devices, or a value other than an address of any device, in one or more embodiments. The operation in the non-WLAN protocol within the frequency band includes transmitting a message in the non-WLAN protocol, after transmitting the message in WLAN protocol, in one or more embodiments.

In one or more embodiments, the disclosure is directed to a system for protocol coexistence. A circuit is implemented to determine whether a frequency band of a WLAN is quiet at a first time instance in one or more embodiments. The device is implemented to transmit a message in WLAN protocol responsive to a determination that the frequency band is quiet at the first time instance, prior to operation in a non-WLAN protocol within the frequency band in one or more embodiments. The message specifies a duration and has a receiver address other than an address belonging to other devices operating within the frequency band in one or more embodiments. The circuit is implemented to operate in the non-WLAN protocol during at least a portion of the specified duration in one or more embodiments.

In one or more embodiments, the circuit includes a detector implemented to detect an energy level of one or more signals in the frequency band. The circuit includes a detector comprising a WLAN subsystem implemented to detect a presence of a message in WLAN protocol in the frequency band in one or more embodiments. The system further includes a storage module for storing the message in WLAN protocol in one or more embodiments. The system further includes a storage module for storing a plurality of messages in WLAN protocol in one or more embodiments, each of the plurality of messages including a corresponding duration value. The system further includes a WLAN subsystem implemented to generate the message in WLAN protocol in one or more embodiments. The system further includes a WLAN subsystem implemented to determine one or more addresses of one or more WLAN devices operating within the frequency band in one or more embodiments. The WLAN subsystem is implemented to send, to each of the one or more addresses, a request for a response to the corresponding request, and to receive the corresponding response in one or more embodiments. In one or more embodiments, the circuit includes a transmitter implemented to be idle during a time period allocated to accommodate operation of one or more WLAN devices. The transmitter is implemented to transmit a message in a non-WLAN protocol, after transmitting the message in WLAN protocol in one or more embodiments.

In one or more embodiments, the disclosure is directed to method for protocol coexistence. Within a frequency band of a WLAN, a device implemented for operation in at least a non-WLAN protocol can determine one or more addresses of one or more WLAN devices operating within the frequency band in one or more embodiments. The device sends, to each of the one or more addresses, a request for a response to the request in one or more embodiments. The device transmits a message in WLAN protocol responsive to receiving the response to each request sent to the one or more addresses in one or more embodiments. The message has a receiver address other than the one or more addresses of the one or more WLAN devices in one or more embodiments. In one or more embodiments, the receiver address includes at least one of: an address of the non-WLAN device, an address with a local bit that is set, a value other than an address belonging to any of the devices, or a value other than an address of any device. The device transmits a message in a non-WLAN protocol, after transmitting the message in WLAN protocol in one or more embodiments.

In one or more embodiments, a WLAN device is implemented to defer to LTE-U signals above a predefined energy detection (ED) threshold. A mechanism based on ED is sometimes not reliable, e.g., where there is significant energy level fluctuation. In one or more embodiments, this can work well when LTE-U signals are strong (e.g., when the detection level is set at a high value), because there is no deferral to weak interference. Deferral to weaker interference can involve adjustment to selected modulation and coding scheme (MCS) levels to gain enough margin to operate in the presence of the weak interference in one or more embodiments. When LTE-U interference is intermittent, MCS adjustment can involve accommodating a worst-case interference (e.g., interference level across time), instead of an average interference level over time in one or more embodiments. The MCS adjustment can be implemented for such accommodation, unless for example the MCS adjustment function can respond quickly to intermittent interference, in one or more embodiments. The WLAN device is implemented to revert to a higher MCS level when possible, in one or more embodiments.

In one or more embodiments, the WLAN ED threshold is set at a relatively high level. For example, the ED threshold can be set at −62 dBm in a 20 MHz bandwidth, as defined in the associated IEEE 802.11 specification, in one or more embodiments. A device potentially operates with an ED threshold closer to −72 dBm in one or more embodiments. Using WLAN protocol preamble detection, a WLAN device defers to another WLAN devices on a primary channel at a detection level of −82 dBm or lower in a 20 MHz bandwidth (e.g., as defined in the associated IEEE 802.11 specification) in one or more embodiments. In one or more embodiments, preamble detection is implemented in a coherent, coordinated manner, and occurs at an energy detection level that is significantly lower than non-protocol-specific energy detection. As such, in one or more embodiments, the beginning of a signal is readily detectable by preamble detection.

In the absence of suitable mechanisms for LTE-U and WLAN coexistence, one or both of WLAN and LTE-U system throughputs can suffer due to collisions, in one or more embodiments. In one or more embodiments, some or most collisions cannot be countered by MCS adjustment. For instance, if no ED deferral to WLAN is implemented in a LTE-U device, WLAN system can suffer substantially in system throughput in one or more embodiments.

A device, such as a LTE-U device, that does not have to have WLAN capabilities, is implemented to send a WLAN message, such as a clear to send (CTS) message in one or more embodiments. The non-WLAN device sends such a message to quiet or suppress the WLAN medium for a duration of time before the device begins to transmit in a non-WLAN protocol in one or more embodiments. In one or more embodiments, the WLAN message does not have to be generated by the device (which potentially does not have WLAN functionality), but is retrievable as a pre-configured sequence from memory for example. For instance, the device does not have to be implemented with a WLAN protocol stack, encoder and/or some other WLAN-specific element, in one or more embodiments. To ensure that the WLAN message does not collide with other communications in the band, the device determines if the medium is quiet before sending the WLAN message to reserve the medium for operation by the device, in one or more embodiments. For example, the device sends a request to send (RTS) message to determine if the medium is quiet in one or more embodiments. Since preamble detection implemented under a specific protocol occurs at an energy detection level that is significantly lower than non-protocol-specific energy detection, a non-WLAN device can be implemented to support WLAN protocol preamble detection (e.g., via a WLAN subsystem 233) in one or more embodiments. For example, in one or more embodiments, a non-WLAN device is implemented with a WLAN subsystem 233 to detect a CTS response (e.g., a WLAN-formatted response) to the RTS message. A CTS response from other WLAN devices in the frequency band confirms to the non-WLAN device that the medium is quiet, in one or more embodiments.

Figure 2A:
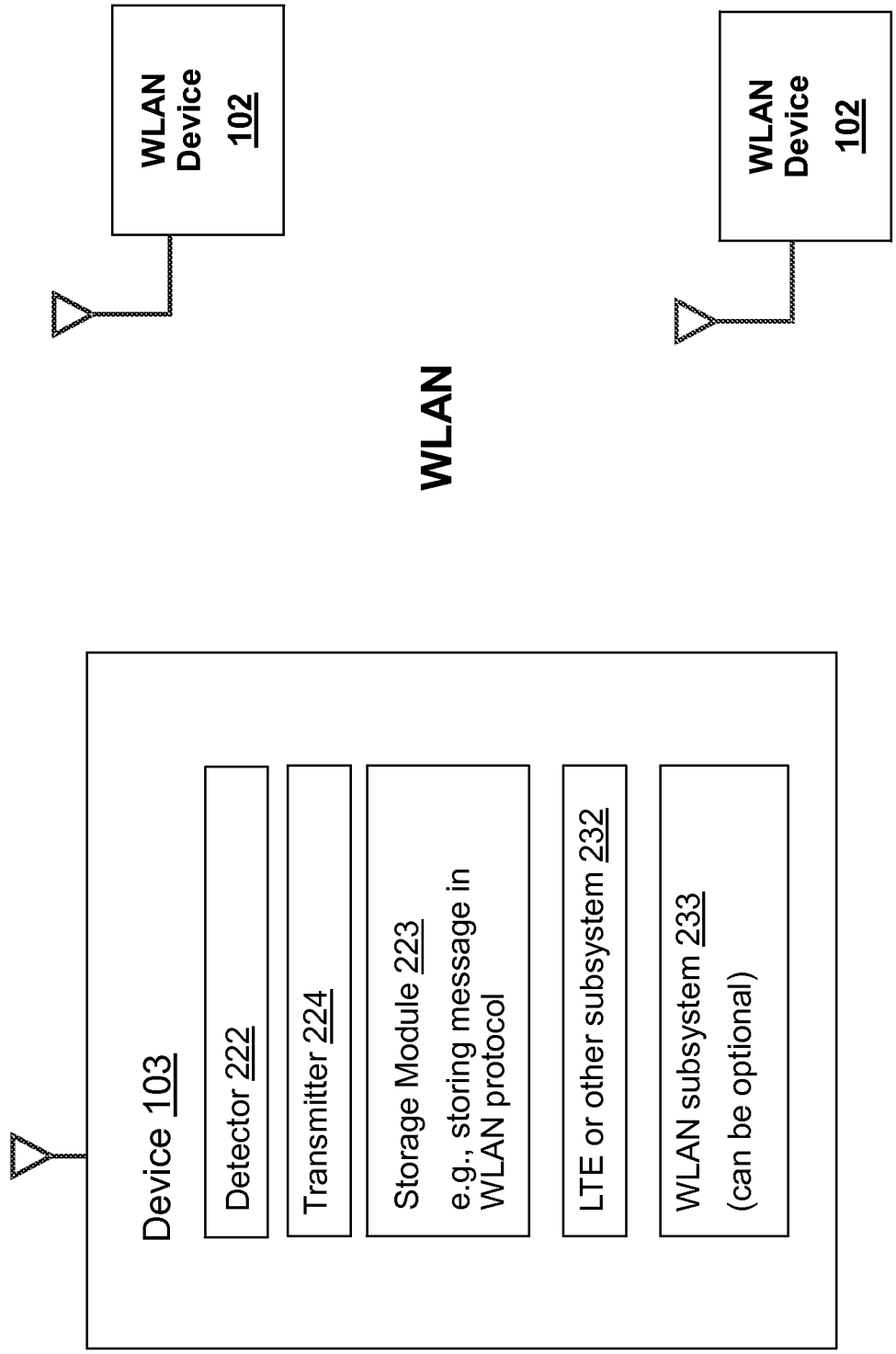
FIG. 2A is a block diagram depicting an embodiment of a system for long-term evolution unlicensed (LTE-U) and wireless local area network (WLAN) coexistence.

Referring to FIG. 2A, one or more embodiments of a system for LTE-U and WLAN coexistence is depicted. In brief overview, the system includes, in one or more embodiments, a device 103 operating within a frequency band of a WLAN environment that includes one or more WLAN devices 102. The device 103 includes one or more of: a detector 222, a transmitter 224, a storage module 223, a LTE or other subsystem 232, or a WLAN subsystem 233, in one or more embodiments. Each of these elements or modules is implemented in hardware, or a combination of hardware and software, in one or more embodiments. For instance, each of these elements or module can include any application, program, library, script, task, service, process or any type and form of executable instructions executing on hardware of the device 103, in one or more embodiments. The hardware includes one or more of circuitry or a processor, for example, as described above in connection with at least 1B and 1C, in one or more embodiments.

Although certain portions of the disclosure refer to coexistence between LTE-U and WLAN communications and devices, these references are merely for illustration and not intended to be limiting. For example, the coexistence can be between WLAN and non-WLAN devices, between devices using different communications protocols, and/or between devices using differing modulation techniques and/or having differing capabilities.

In one or more embodiments, the device 103 includes a detector 222 designed, built and/or implemented to detect an energy level of a signal or message within a frequency band of the WLAN environment. The detector 222 monitors, measures, determines or otherwise detects a message or energy level of a WLAN or non-WLAN message or signal in one or more embodiments. For example, the detector 222 detects a CTS response to a RTS message sent by the device 103 in one or more embodiments. The detector 222 detects particular content and/or a characteristic of a message from another device, for example, a LTE-U protocol preamble of the message, in one or more embodiments. A protocol preamble (e.g., for WLAN, LTE-U) includes one or more predefined patterns or sequences of data or information in one or more embodiments. The detector 222 detects a protocol preamble at an energy level lower than an ED level of a non-protocol-specific signal in one or more embodiments. One or more WLAN devices 102 includes a detector with elements and/or features similar to those of detector 222 in one or more embodiments. For instance, WLAN device 102 includes a detector implemented to detect a WLAN protocol preamble in a signal from another device in one or more embodiments.

In one or more embodiments, the device 103 includes a transmitter 224 implemented to transmit one or more messages in one or more specific communication protocols (e.g., a WLAN protocol and/or a LTE protocol). For example, the transmitter 224 is designed, built and/or implemented to transmit a CTS frame or message in one or more embodiments. The transmitter 224 transmits or broadcasts the CTS message to other devices 102 in the WLAN environment in one or more embodiments. The device 103 intends the WLAN devices 102 in the WLAN environment to be recipients of the CTS message in one or more embodiments.

The transmitter 224 sends the message in an attempt to quiet or reserve the WLAN frequency band for operation by the device 103 in one or more embodiments. The CTS message includes one or more fields, for example, frame control, duration (DUR), receiver address (RA) and frame check sequence (FCS) in one or more embodiments. A CTS message is referred to, or classified as a certain type of CTS message, for example based on at least the value set in the RA field in one or more embodiments. For example, a CTS message from the device 103 with a RA value set to the address of the device 103 itself is referred to as a CTS2SELF message in one or more embodiments. A CTS message from the device 103 with a RA value set to an address unused by any device, or not expected to be used by any device, in the WLAN environment, can be referred to as a CTS2NOWHERE, CTS2N or CTS2SOMEWHERE message in one or more embodiments. For instance, the RA value can be set to an address of a device known to operate in a different network, or an address reserved for a different network in one or more embodiments.

In one or more embodiments, the transmitter 224 is implemented to transmit a CTS message with an RA value set to an address other than an address of a device 102 operating in the local WLAN environment. The CTS frame is implemented to include an address in the RA field that does not match that of a recipient, e.g., device 102 operating in the local WLAN environment, in one or more embodiments. For instance, the RA value is set to a unicast address (e.g., 48-bit address) that is known to not belong to or used by any receiver (e.g., in the local WLAN environment), a multicast address that is known to not belong to any group in use (e.g., in the local WLAN environment), or a locally administered address that is known or believed to not be in use (e.g., in the local WLAN environment), in one or more embodiments. By way of illustration, the RA is set to the address of the transmitter, e.g., an address of device 103, in one or more embodiments. The transmitter 224 is implemented to transmit a CTS message with an address discussed above, and/or with a local bit or local address bit set, a value other than an address belonging to any of the devices, or a value other than an address of any device, in one or more embodiments.

In one or more embodiments, the transmitter 224 is implemented to transmit a CTS message with a value in the duration field that sets a network allocation vector (NAV) of a recipient (e.g., devices 102) to a time duration intended to cover subsequent transmissions from the device 103. The NAV indicates a period of time during which a recipient device 102 refrains from transmitting a message into the WLAN frequency band in one or more embodiments. This allows the device 103 to reserve and use the frequency band for a period of time set in the duration field, for the subsequent transmissions which can be in a non-WLAN protocol, in one or more embodiments. The subsequent transmissions or frames from the device 103 (e.g., during the period of time) can be of a protocol or modulation that is undetectable and/or undecodable by the devices 102 in one or more embodiments. For example, the device 103 can include a LTE or other subsystem 232 designed, built and/or implemented to communicate in a protocol or modulation different from WLAN or 802.11, in one or more embodiments. Upon reserving the medium or achieving a quiet medium, the subsystem 232 generates the subsequent transmissions or frames from the device 103 within the time period indicated in the duration field, in one or more embodiments.

The non-WLAN device 103 does not have to be aware of the entire MAC or WLAN protocol to send the CTS frame in one or more embodiments. For example, in one or more embodiments, the device 103 sends a stored copy of a CTS frame with a fixed DUR value of d usec. The device 103 had access to a plurality of stored CTS frames, with different DUR values, that the device 103 can select from for transmission. In one or more embodiments, the transmitter 224 sends a copy of a stored CTS frame every d usec for deferrals longer than d. The reservation time, d, can be set to a value longer than an expected duration of the subsequent transmissions in one or more embodiments. The reservation time or duration, d, represents an amount of time following the CTS frame that equals or exceeds the amount of time expected for the transmission of the subsequent frames using any one or a combination of a different modulation and the same modulation used for the CTS frame, in one or more embodiments.

In one or more embodiments, a non-WLAN device 103 (e.g., LTE-U device) transmits a CTS message in the midst of potential or existing 802.11 activity. If the CTS message is sent into an ongoing (e.g., WLAN) transmission, the CTS message can collide and is potentially not received by WLAN devices 102, and produces no or a limited result in one or more embodiments. In one or more embodiments, the non-WLAN device 103 waits for a quiet medium in the WLAN frequency band before sending the CTS message. In some scenarios and in one or more embodiments, the device 103 does not know if the CTS frame transmission was successful in quieting the medium, e.g., due to possible collision with the transmitted CTS frame despite an earlier quietness. In one or more embodiments, the non-WLAN device 103 uses ED or another mechanism to detect quiet medium. ED is suitable possibly at a significantly lowered ED threshold implementable, in one or more embodiments.

In one or more embodiments, a WLAN device 102 loses throughput when compared to the LTE-U devices. For example, in one or more embodiments, a WLAN device defers to a CTS2N message at a lower, packet (preamble) detect level, but the LTE-U devices is set to defer at a higher, ED detect level, if implemented.

In one or more embodiments, the device 103 is implemented to use RTS-CTS to potentially eliminate or avoid at least some of the collision scenarios discussed herein. In one or more embodiments, the non-WLAN device 103 sends a RTS frame, and receives a CTS frame in response, e.g., to confirm that it is clear to send the subsequent transmissions. The CTS response confirms that the RTS frame did not have a collision, in one or more embodiments. For this, the non-WLAN device 103 is implemented to discover and/or determine the address of at least one WLAN device 102 to send an RTS frame and generate a CTS response, in one or more embodiments. In one or more embodiments, the non-WLAN device 103 does not have the address information generally. In addition to discovering addresses of nearby WLAN device 102, the non-WLAN device 103 is implemented to verify receipt of a CTS frame and to send an additional CTS message (e.g., CTS2N, CTS2SELF) in response, in one or more embodiments. As such, the non-WLAN device 103 should incorporate some 802.11 behavior or capability in one or more embodiments.

In one or more embodiments, the device 103 is implemented to include a WLAN subsystem 233. The WLAN subsystem 233 can be optional in one or more embodiments, for example, where RTS-CTS is not implemented. The non-WLAN device 103 is implemented to detect a 802.11 CTS frame from a responding device 102 via the WLAN subsystem 233, in one or more embodiments. This implementation is to avoid NAV resetting due to a RTS-NAV reset rule in 802.11, in which devices that detected a RTS frame and did not detect a CTS frame can reset their NAV (to zero), in one or more embodiments. The WLAN subsystem 233 is implemented, designed and/or built to generate one or more WLAN or 802.11 frames of any type (e.g., CTS2N, RTS) in one or more embodiments. In one or more embodiments, the non-WLAN device 103 is implemented to support or provide the following illustrative sequence of frames: RTS-CTS-CTS2SELF.

In one or more embodiments, the device 103 supports other equivalents to a CTS (e.g., CTS2SELF, CTS2N) message. In one or more embodiments, any frame can generally be sent with DUR=d, e.g., a quality of service (QoS) message, a management message, or a control message. The RTS-NAV resetting rule does not apply to these frames in one or more embodiments. Such frames are sent like CTS2SELF (e.g., with the RA corresponding to the transmitter) or like CTS2N for example. No ACK would be generated in one or more embodiments. In one or more embodiments, for a management frame for example, a Quiet element instead of a DUR field can be defined, specified, generated, transmitted and/or used to reserve a time period. In one or more embodiments, a Quiet element includes a field for specifying a length of time, and/or an identifier field. In one or more embodiments, CTS2SELF is a frame with a least length or size among some or all of these alternatives, and offers reduced overhead.

Referring again to FIG. 2A, the device 103 includes a storage module 223 in one or more embodiments. The storage module 223 is implemented, designed and/or built to maintain, hold or otherwise store pre-formatted samples of frames, e.g., RTS, CTS2N, CTS2SELF and/or their alternatives, in one or more embodiments. The storage module 223 is implemented to storage pre-configured or predefined copies and/or versions of frames onboard the non-WLAN device 103 in one or more embodiments. The storage module 223 includes any embodiment of elements and/or features of storage 128, main memory 122 and/or cache 140 described above in connection with at least FIGS. 1B and 1C, in one or more embodiments. The storage module 223 includes a RAM or other physical level structure for storing a plurality of versions of a 802.11-formatted or WLAN-formatted frame, e.g., each including a different DUR value, in one or more embodiments. The transmitter accesses and/or selects a frame from the storage module to transmit, e.g., as a CTS frame (e.g., CTS2N frame), in one or more embodiments.

In one or more embodiments, a (e.g., LTE-U) schedule of the device 103 is implemented at least in part to accommodate WLAN operation. For instance, a LTE-U base station leaves some time in a LTE-U schedule unallocated in one or more embodiments. The LTE-U base station implements time division multiplexing (TDM) between two or more communications protocols in one or more embodiments. In one or more embodiments, the LTE-U base station implements at least one time period that provides a free or idle medium for WLAN (or non-LTE) operation, for example. One or more WLAN devices 102 obey listen-before-talk (LBT) protocol and ED deferral during normal, scheduled times for LTE-U operation, in one or more embodiments. In other words, the one or more WLAN devices 102 defer to scheduled LTE-U transmissions based on ED and/or LBT protocol, in one or more embodiments. The one or more WLAN devices 102 can operate during an LTE-U unscheduled time period, in one or more embodiments. When an un-scheduled time period occurs, the one or more WLAN devices detects can available or idle medium, and can transmit in WLAN protocol, in one or more embodiments.

In one or more embodiments, a non-WLAN (e.g., LTE-U) device 103 sends a CTS message (e.g., CTS2N message) to regain control of the medium. In one or more embodiments, the device 103 sends a continuous wave (CW) or some other signal at high power to trigger or force WLAN ED-based deferral. In one or more embodiments, negotiation on the division of time resource between WLAN and LTE-U (or non-WLAN) can be performed by the WLAN and LTE-U devices. For example, in one or more embodiments, an access point with knowledge about the types of devices 102, 103 operating in an area can send a request or instruction to an LTE base station to schedule a time period for non-LTE operation.

In one or more embodiments, a WLAN modem (e.g., as part of WLAN subsystem 233) of the device 103 is used to gain medium access for LTE-U operation. One or more receive/transmit WLAN chains is used while other chains can be used for regular WLAN operation (in a multiple chain/antenna WLAN modem) in one or more embodiments. In one or more embodiments, a front end of the WLAN modem can be (re)used for LTE-U transmission/reception. In one or more embodiments, the WLAN subsystem 223 generates WLAN signals to quiet the medium for a period of time to allow LTE-U operation, for example, RTS-CTS, CTS2SELF or a Quiet Element. The WLAN subsystem generates one or more WLAN signals to allow resumption of WLAN activity in one or more embodiments. For example, a CF-END message is sent to cancel any remaining unused NAV time period (e.g., if LTE transmissions ended before the specified duration of DUR), in one or more embodiments.

In one or more embodiments, a WLAN subsystem 233 learns a LTE-U schedule and uses the information to gain WLAN channel access. The WLAN subsystem 233 can do so through internal signaling in one or more embodiments. The WLAN subsystem 233 detects unallocated times for LTE-U operation and learns the LTE-U schedule in one or more embodiments.

In one or more embodiments, a WLAN-LTE-U coexistence mechanism is implemented which includes one or more of the following features: both WLAN and LTE-U devices defer at a similar ED threshold level, both WLAN and LTE-U devices defer at a similar packet detect level threshold level, a WLAN modem is used to gain LTE-U medium access, the non-WLAN device 103 implements some of WLAN functionality (e.g., a LTE-U device directly implements 802.11 preamble detect and PHY SIG field decode (e.g., orthogonal frequency-division multiplexing binary phase-shift keying (OFDM-BPSK)) to determine a Physical Layer Convergence Protocol Data Unit (PPDU) duration for deferral time, and/or a non-WLAN device 103 directly implements transmission of basic WLAN waveforms required for proper coexistence with WLAN (CTS2SELF, RTS-CTS and Quiet Element, for example)). In one or more embodiments, a hybrid solution such as LTE-U system sending CTS2SELF, RTS-CTS and Quiet Element potentially disadvantages a WLAN system, because WLAN devices defer at the lower, packet (preamble) detect level while LTE-U devices defer at the higher, ED level (if implemented).

Figure 2B:
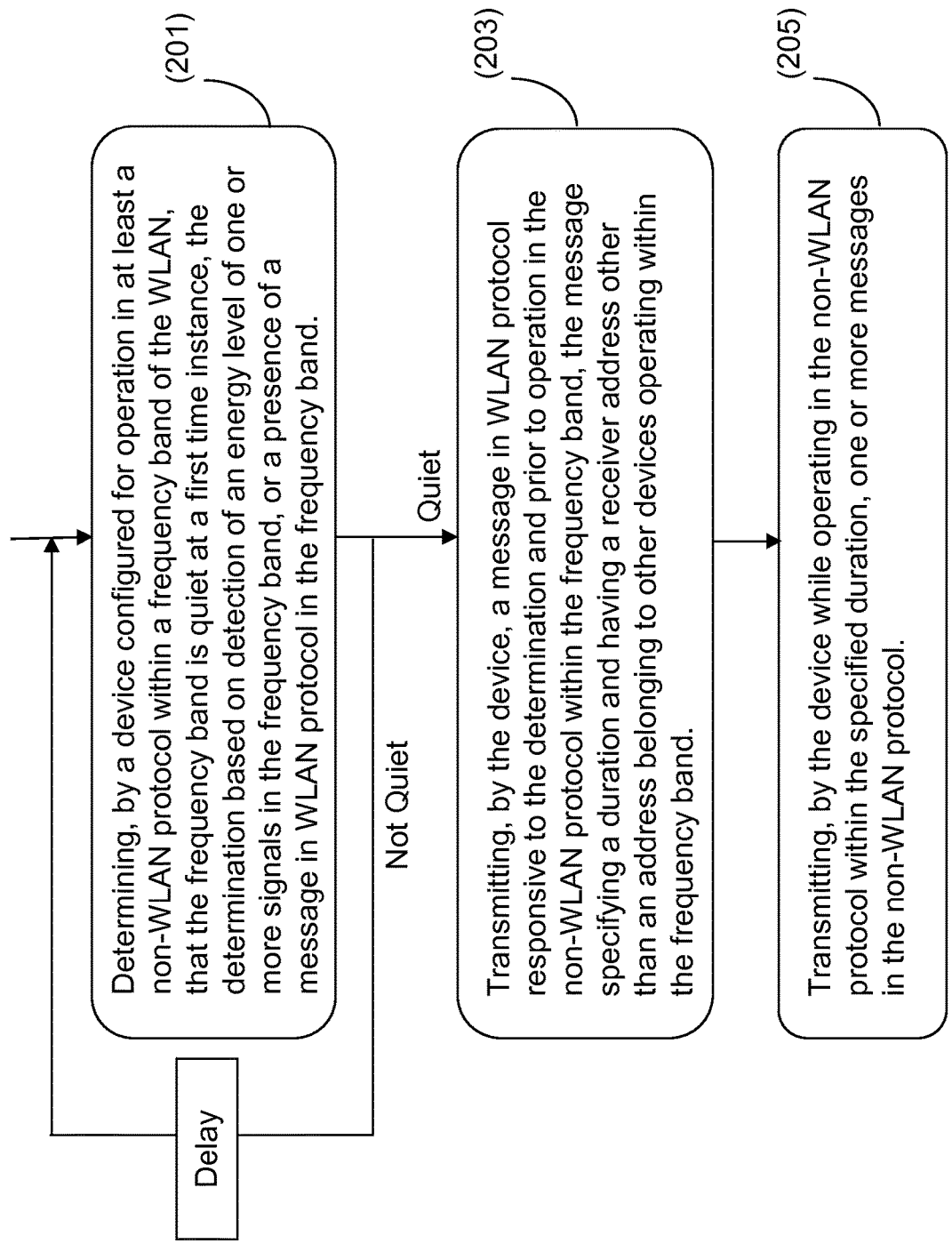
FIG. 2B is a flow diagram depicting an embodiment of a method for LTE-U and WLAN coexistence.

Referring now to FIG. 2B, one or more embodiments of a method for LTE-U and WLAN coexistence is depicted. In one or more embodiments, the method includes determining, by a device implemented for operation in at least a non- WLAN protocol within a frequency band of the WLAN, that the frequency band is quiet at a first time instance (operation 201). The determination is based on detection of an energy level of one or more signals in the frequency band, or a presence of a message in WLAN protocol in the frequency band, in one or more embodiments. The device 103 transmits a message in WLAN protocol responsive to the determination and prior to operation in the non-WLAN protocol within the frequency band, in one or more embodiments (operation 203). The message specifies a duration and has a receiver address other than an address belonging to other devices operating within the frequency band. The device 103 transmits, while operating in the non-WLAN protocol within the specified duration, one or more messages in the non-WLAN protocol (operation 205).

Referring now to operation 201, and in one or more embodiments, a device 103 is implemented for operation in at least a non-WLAN protocol within a frequency band of the WLAN, and determines that the frequency band is quiet at a first time instance (operation 201). For example, the device 103 incorporates or comprises a LTE device 103 or a LTE subsystem 232 in one or more embodiments. In one or more embodiments, the device 103 determines whether the frequency band or medium is quiet or free, in order to prepare for operation in the non-WLAN protocol (e.g., a LTE-based protocol). This check avoids collision of the non-WLAN transmission with other WLAN messages in the same frequency band, in one or more embodiments. In one or more embodiments, before sending a non-WLAN message, the device 103 uses a mechanism, such as energy level detection or RTS-CTS, to determine if a particular time instant is appropriate to send the message. The determination is based on detection of an energy level of one or more signals in the frequency band, or a presence of a message in WLAN protocol in the frequency band, in one or more embodiments. In one or more embodiments, the device 103 performs the determination or detection via a detector. The detector can, for example incorporate any one or more embodiments of features of the detector 222 discussed above in connection with at least FIG. 2A.

In one or more embodiments, the device 103 detects an energy level of one or more signals in the frequency band or medium. The device 103 monitors, measures, determines or otherwise detects an energy level of a signal or message within a frequency band of the WLAN environment. The detector 222 detects the energy level of a WLAN or non-WLAN message in one or more embodiments. In one or more embodiments, the detector 222 detects a presence of a message or signal based on any energy level detected. The device 103 delays signal transmission (e.g., sending a CTS frame, operation in the non-WLAN protocol or mode) based on a determination of an energy level of one or more signals in the frequency band or medium. In one or more embodiments, the device 103 defers to a signal having an energy level above a predefined ED threshold. For example, the device delays signal transmission in response to detecting one or more signals with an energy level above a predefined threshold.

In one or more embodiments, the device detects the presence of a message in WLAN protocol in the frequency band or medium. The detector 222 detects a protocol preamble (e.g., in WLAN or LTE format) in a signal from another device in one or more embodiments. The detector 222 detects the protocol preamble of a message based on particular content and/or a characteristic of the message, in one or more embodiments. For example, the detector 222 detects a WLAN-formatted CTS response to a RTS message sent by the device 103 in one or more embodiments. Using WLAN protocol preamble detection, the device 103 defers to another device 102 on a primary channel at a predetermined detection level. The detector 222 performs preamble detection in a coherent, coordinated manner, and occurs at an energy detection level that can be significantly lower than non-protocol-specific energy detection.

By way of illustration, the device 103 is implemented to use RTS-CTS, for example as described above in connection with at least FIG. 2A. The device 103 sends the RTS message to determine if the medium is quiet in one or more embodiments. In one or more embodiments, the non-WLAN device 103 sends a RTS frame, and receives a CTS frame in response, e.g., to confirm that it is clear to a subsequent transmission. In one or more embodiments, the non-WLAN device 103 includes a WLAN subsystem 233 to detect the CTS response (e.g., a WLAN-formatted response) to the RTS message. One or more CTS responses from other WLAN devices in the frequency band confirm to the non-WLAN device that the medium is quiet, in one or more embodiments. The CTS response(s) confirm that the RTS frame did not have a collision, in one or more embodiment.

The device 103 determines whether at least one other device (e.g., a WLAN device 102) is operating within the frequency band or medium, based on the determination or detection, in one or more embodiments. In one or more embodiments, the device 103 determines that at least one device is operating within the frequency band at a time instance prior to, or at the first time instance, and determines to delay transmission of the message in WLAN protocol. Based on the determination or detection, the device delays transmission of a CTS "reservation" frame, and/or operation in the non-WLAN protocol, for a predefined period of time in one or more embodiments. In one or more embodiments, the device performs or repeats the detection or determination after a predefined period of time. In one or more embodiments, the device monitors or checks the medium intermittently or based on a schedule, until the medium is quiet or free.

Referring now to operation 203, the device 103 transmits a message in WLAN protocol (e.g., a CTS "reservation" frame) responsive to the determination and prior to operation in the non-WLAN protocol within the frequency band, in one or more embodiments. The device 103 transmits the message to reserve the medium for a period of time, in one or more embodiments. The device 103 transmits the message based on the determination or detection, e.g., based on the determination that the medium or frequency band is quiet. The device 103 transmits the message via a transmitter. The transmitter can incorporate any one or more embodiments of features of the transmitter 224 described above in connection with at least FIG. 2A.

The transmitter 224 transmits a CTS frame or message in one or more embodiments. The transmitter 224 transmits or broadcasts the CTS message to other devices 102 in the WLAN environment in one or more embodiments. The device 103 intends at least the WLAN devices 102 in the WLAN environment to be recipients of the CTS message in one or more embodiments. The transmitter 224 sends the CTS "reservation" message in an attempt to quiet or reserve the WLAN frequency band for operation by the device 103 in one or more embodiments. In one or more embodiments, the CTS message specifies a duration or reservation time period. The transmitter 224 transmits a CTS message with a value in the duration field that sets a network allocation vector (NAV) of a recipient (e.g., devices 102) to a time duration intended to cover subsequent transmissions from the device 103. This allows the device 103 to reserve and use the frequency band for the period of time set in the duration field, for subsequent transmissions which can be in a non-WLAN protocol, in one or more embodiments.

In one or more embodiments, the transmitter 222 transmits a CTS message that has a receiver address other than an address belonging to other devices 102 operating within the frequency band. In one or more embodiments, the receiver address includes at least one of: an address of the non-WLAN device, an address with a local bit that is set, or a value other than one belonging to any of the devices. For example, in one or more embodiments, the transmitter sends a CTS message with a RA value set to the address of the device 103 itself (e.g., a CTS2SELF message). In one or more embodiments, the transmitter sends a CTS message with a RA value set to an address unused by any device, or not expected to be used by any device, in the WLAN environment (e.g., a CTS2NOWHERE, CTS2N or CTS2SOMEWHERE). In one or more embodiments, the RA value is specified with a local bit set so that the associated address is set as a local address instead of a global address, e.g., so that the probability of a device 102 having an address that matches the RA is low.

In one or more embodiments, the WLAN message does not have to be generated by the device (which potentially does not have WLAN functionality), but is retrievable as a pre-configured sequence from memory for example. The device 103 retrieves the message in WLAN protocol from a storage module of the non-WLAN device, in one or more embodiments. The storage module can include embodiments of features of the storage module 223 described above in connection with at least FIG. 2A. The transmitter 224 accesses and/or selects a frame from the storage module, and transmits the frame as a CTS frame (e.g., CTS2N frame), in one or more embodiments.

In one or more embodiments, the message in WLAN protocol includes a CTS message, a RTS message, a quality of service message, a management message, or a control message. For example, as discussed above in connection with at least FIG. 2A, the device 103 supports other equivalents to a CTS message, and another type of frame can be sent to specify a reservation duration, in one or more embodiments. In a management frame for example, a Quiet element instead of a DUR field can be defined, specified, generated, transmitted and/or used to reserve a time period in one or more embodiments. The storage module 223 stores or maintains pre-configured copies of any one or more of these frames or messages for retrieval and use by the device 103 in one or more embodiments.

Referring now to operation 205, the device 103 transmits, while operating in the non-WLAN protocol within the specified duration, one or more messages in the non-WLAN protocol. In one or more embodiments, operation in the non-WLAN protocol within the frequency band includes transmitting a message in the non-WLAN protocol (e.g., in a LTE-based protocol), after transmitting the message in WLAN protocol (e.g., a CTS2N frame). For example, upon reserving the medium or achieving a quiet medium, the LTE subsystem 232 generates the subsequent LTE transmissions or frames within a time period indicated in the duration field, in one or more embodiments. When WLAN devices 102 in the area successfully detect the message and ascertain that they are not addressed or identified by the RA value in the message, these devices 102 can refrain from operation for a duration of time specified in the message, in one or more embodiments. Thus, the non-WLAN device 103 can operate in the WLAN frequency band without interference from the WLAN devices 102 for the specified duration of time, in one or more embodiments.

Figure 2C:
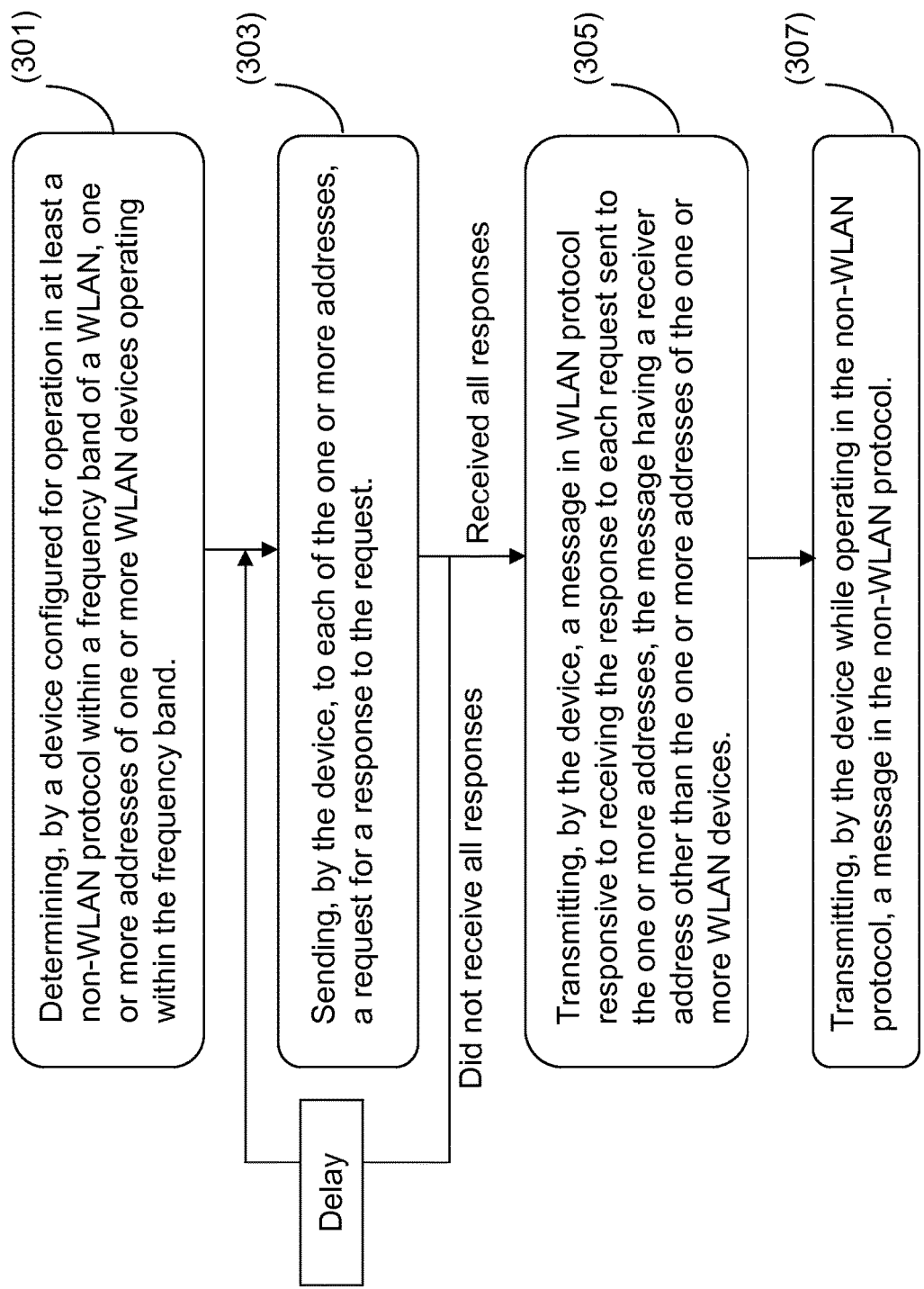
FIG. 2C is a flow diagram depicting another embodiment of a method for LTE-U and WLAN coexistence.

Referring now to FIG. 2C, one embodiment of a method for LTE-U and WLAN coexistence is depicted. In one or more embodiments, the method includes determining, by a device 103 implemented for operation in at least a non-WLAN protocol within a frequency band of a WLAN, one or more addresses of one or more WLAN devices 102 operating within the frequency band (operation 301). The device 103 sends, to each of the one or more addresses, a request for a response to the request in one or more embodiments (operation 303). The device 103 transmits a message in WLAN protocol responsive to receiving the response to each request sent to the one or more addresses in one or more embodiments (operation 305). The message has a receiver address other than the one or more addresses of the one or more WLAN devices in one or more embodiments. The device 103 transmits, while operating in the non-WLAN protocol, a message in the non-WLAN protocol in one or more embodiments (operation 307).

Referring now to operation 301, and in one or more embodiments, a device 103 implemented for operation in at least a non-WLAN protocol within a frequency band of a WLAN determines one or more addresses of one or more WLAN devices 102 operating within the frequency band (operation 301). In one or more embodiments, the device 103 is implemented to use RTS-CTS, for example as described above in connection with at least FIG. 2A. In one or more embodiments, the device 103 is implemented to use RTS-CTS to potentially eliminate or avoid collision scenarios discussed earlier. In one or more embodiments, the non-WLAN device 103 sends a RTS frame (or a request-to-send frame) to devices 102 present in the WLAN environment or frequency band. The non-WLAN device 103 discovers or otherwise determines the number of devices 102 present or operating in the WLAN environment or frequency band. The non-WLAN device 103 discovers or otherwise determines the address of at least one device 102 (e.g., a WLAN device) to send an RTS frame, in one or more embodiments.

A WLAN subsystem 233 of the device 103 performs the discovery or determination in one or more embodiments. The WLAN subsystem 233 detects signals from the one or more devices 102, and can identify the one or more devices 102 in one or more embodiments. In one or more embodiments, the WLAN subsystem 233 extracts one or more addresses of the devices 102 from the detected signals. In one or more embodiments, the WLAN subsystem 233 sends a request to the devices 102 for the one or more addresses of devices 102. In one or more embodiments, the WLAN subsystem 233 requests the devices 102 to each send a response, and determines an address of each device 102 from the corresponding response.

Referring now to operation 303, the device 103 sends, to each of the one or more addresses, a request (e.g., RTS frame) for a response (e.g., a CTS frame) to the request in one or more embodiments. The device 103 sends the one or more RTS message to determine if the medium is available or quiet in one or more embodiments. In one or more embodiments, the non-WLAN device 103 sends a first RTS frame, and receives a first CTS frame from a first device 102 in response to the first RTS frame, e.g., to confirm that it is clear to send a subsequent transmission, with respect to the first device 102. In one or more embodiments, the WLAN subsystem 233 detects each CTS response (e.g., a WLAN-formatted response) to the RTS message. The CTS responses from the devices 102 in the frequency band confirm to the non-WLAN device 103 that the medium is quiet or available with respect to the devices 102, in one or more embodiments. The CTS response(s) confirm that the RTS frame did not have a collision, in one or more embodiment.

In one or more embodiments, the device 103 sends or broadcasts a single request (e.g., RTS frame) to one or more other devices 102 present or operating in the WLAN environment. In one or more embodiments, if the number of CTS responses from the devices 102 matches the number of devices 102 present or operating in the WLAN environment, the device 103 determines that the medium is available or quiet. In one or more embodiments, if the number of CTS responses from the devices 102 do not match the number of devices 102 present or operating in the WLAN environment, the device 103 determines that the medium not quiet, e.g., that a collision with the RTS frame can have occurred for at least one of the devices 102. In the latter case, the device 103 delays transmission of a CTS "reservation" frame in one or more embodiments. Based on one or more missing CTS responses, the device delays transmission of a CTS "reservation" frame and/or operation in the non-WLAN protocol, for a predefined period of time, in one or more embodiments. In one or more embodiments, the device performs or repeats the detection or determination (e.g., operation 303) after a predefined period of time. In one or more embodiments, the device monitors or checks the medium intermittently or based on a schedule, until the medium is quiet or free.

Referring now to operation 305, the device 103 transmits a message in WLAN protocol responsive to receiving the response (e.g., CTS response) to each request (e.g., RTS request) sent to the one or more addresses in one or more embodiments (operation 305). The message has a receiver address other than the one or more addresses of the one or more devices 102 (e.g., WLAN devices 102) in one or more embodiments. In one or more embodiments, the device 103 transmits a message in WLAN protocol (e.g., a CTS "reservation" frame) responsive to receiving CTS responses to the RTS request. The device 103 transmits the message to reserve the medium for a period of time, in one or more embodiments. The device 103 transmits the message based on the determination, via the CTS responses, that the medium or frequency band is available for a subsequent transmission (e.g., of a CTS2N frame). The device 103 transmits the message via a transmitter. The transmitter can incorporate any one or more embodiments of features of the transmitter 224 described above in connection with at least FIG. 2A.

The transmitter 224 transmits a CTS frame or message (e.g., CTS2N, CTS2SELF frame) in one or more embodiments. The transmitter 224 transmits or broadcasts the CTS message to other devices 102 in the WLAN environment in one or more embodiments. The device 103 intends at least the WLAN devices 102 in the WLAN environment to be recipients of the CTS message in one or more embodiments. The transmitter 224 sends the CTS "reservation" message in an attempt to quiet or reserve the WLAN frequency band for operation by the device 103 in one or more embodiments. In one or more embodiments, the CTS message specifies a duration or reservation time period. The transmitter 224 transmits a CTS message with a value in the duration field that sets a network allocation vector (NAV) of a recipient (e.g., devices 102) to a time duration intended to cover subsequent transmissions from the device 103. This allows the device 103 to reserve and use the frequency band for the period of time set in the duration field, for subsequent transmissions which can be in a non-WLAN protocol, in one or more embodiments.

In one or more embodiments, the transmitter 222 transmits a CTS message that has a receiver address other than an address belonging to other devices 102 operating within the frequency band. In one or more embodiments, the receiver address includes at least one of: an address of the non-WLAN device, and an address with a local bit that is set. For example, in one or more embodiments, the transmitter sends a CTS message with a RA value set to the address of the device 103 itself (e.g., a CTS2SELF message). In one or more embodiments, the transmitter sends a CTS message with a RA value set to an address unused by any device, or not expected to be used by any device, in the WLAN environment (e.g., a CTS2NOWHERE, CTS2N or CTS2SOMEWHERE). In one or more embodiments, the RA value is specified with a local bit set so that the associated address is set as a local address instead of a global address, e.g., so that the probability of a device 102 having an address that matches the RA is low.

In one or more embodiments, the WLAN message does not have to be generated by the device (which potentially does not have WLAN functionality), but is retrievable as a pre-configured sequence from memory for example. The device 103 retrieves the message in WLAN protocol from a storage module of the non-WLAN device, in one or more embodiments. The storage module can include embodiments of features of the storage module 223 described above in connection with at least FIG. 2A. The transmitter 224 accesses and/or selects a frame from the storage module, and transmits the frame as a CTS frame (e.g., CTS2N frame), in one or more embodiments.

In one or more embodiments, the message in WLAN protocol includes a CTS message, a RTS message, a quality of service message, a management message, or a control message. For example, as discussed above in connection with at least FIG. 2A, the device 103 supports other equivalents to a CTS message, and another type of frame can be sent to specify a reservation duration, in one or more embodiments. In a management frame for example, a Quiet element instead of a DUR field can be defined, specified, generated, transmitted and/or used to reserve a time period in one or more embodiments. The storage module 223 stores or maintains pre-configured copies of any one or more of these frames or messages for retrieval and use by the device 103 in one or more embodiments.

Referring now to operation 307, the device 103 transmits, while operating in the non-WLAN protocol within the specified duration, one or more messages in the non-WLAN protocol. In one or more embodiments, operation in the non-WLAN protocol within the frequency band includes transmitting a message in the non-WLAN protocol (e.g., in a LTE-based protocol), after transmitting the message in WLAN protocol (e.g., a CTS2N frame). For example, upon reserving the medium or achieving a quiet medium, the LTE subsystem 232 generates the subsequent LTE transmissions or frames within a time period indicated in the duration field, in one or more embodiments. When WLAN devices 102 in the area successfully detect the message and ascertain that they are not addressed or identified by the RA value in the message, these devices 102 can refrain from operation for a duration of time specified in the message, in one or more embodiments. Thus, the non-WLAN device 103 can operate in the WLAN frequency band without interference from the WLAN devices 102 for the specified duration of time, in one or more embodiments.

Although the disclosure might reference one or more "users", such "users" can refer to user-associated devices, for example, consistent with the terms "user" and "multi-user" typically used in the context of a MU-MIMO environment. Although examples of communications systems described above can include devices and access points operating according to an IEEE 802.11, 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method of protocol coexistence, the method comprising:
   determining, within a frequency band of a wireless local area network (WLAN) by a device configured for operation in at least a non-WLAN protocol, whether the frequency band is quiet;
   transmitting, by the device, a message in WLAN protocol if it is determined that the frequency band is quiet, prior to operation in the non-WLAN protocol within the frequency band, the message having a receiver address other than an address belonging to other devices operating within the frequency band; and
   delaying the transmission of the message in WLAN protocol if it is determined that the frequency band is not quiet at a first time instance, by repeating the determining intermittently, or based on a schedule or a predefined delay, until the frequency band is quiet.

2. The method of claim 1, wherein the device comprises a long term evolution (LTE) device.

3. The method of claim 1, comprising determining that at least one WLAN device is operating within the frequency band, and determining to delay transmission of the message in WLAN protocol.

4. The method of claim 1, comprising retrieving, from a storage module of the non-WLAN device, the message in WLAN protocol.

5. The method of claim 1, wherein the message in WLAN protocol comprises a clear to send (CTS) message, a request to send (RTS) message, a quality of service message, a management message, or a control message.

6. The method of claim 1, wherein the receiver address comprises at least one of: an address of the non-WLAN device, an address with a local bit that is set, or a value other than an address of any device.

7. The method of claim 1, wherein the operation in the non-WLAN protocol within the frequency band comprises transmitting a message in the non-WLAN protocol, after transmitting the message in WLAN protocol.

8. A system for protocol coexistence, the system comprising:
   WLAN subsystem circuitry configured to determine whether a frequency band of a wireless local area network (WLAN) is quiet;
   a storage module; and
   a transmitter configured to:
      transmit a message in WLAN protocol if it is determined that the frequency band is quiet, prior to operation in a non-WLAN protocol within the frequency band, the message specifying a duration and having a receiver address other than an address belonging to other devices operating within the frequency band, wherein the WLAN subsystem circuitry is configured to operate in the non-WLAN protocol during at least a portion of the specified duration, and
      delay the transmission of the message in WLAN protocol if it is determined that the frequency band is not quiet at a first time instance, by repeating the determining intermittently, or based on a schedule or a predefined delay, until the frequency band is quiet.

9. The system of claim 8, wherein the WLAN subsystem circuitry comprises a detector configured to detect an energy level of one or more signals in the frequency band.

10. he system of claim 8, wherein the WLAN subsystem circuitry comprises a detector configured to detect a presence of a message in WLAN protocol in the frequency band.

11. The system of claim 8, wherein the storage module is configured for storing the message in WLAN protocol.

12. The system of claim 8, wherein the storage module is configured for storing a plurality of messages in WLAN protocol, each of the plurality of messages including a corresponding duration value.

13. The system of claim 8, wherein the WLAN subsystem circuitry is configured to generate the message in WLAN protocol.

14. The system of claim 8, wherein the WLAN subsystem circuitry is configured to determine one or more addresses of one or more WLAN devices operating within the frequency band.

15. The system of claim 14, wherein the WLAN subsystem circuitry is configured to send, to each of the one or more addresses, a request for a response to the corresponding request, and to receive the corresponding response.

16. The system of claim 8, wherein the transmitter is configured to be idle during a time period allocated to accommodate operation of one or more WLAN devices.

17. The system of claim 8, wherein the transmitter is configured to transmit a message in a non-WLAN protocol, after transmitting the message in WLAN protocol.

18. A method for protocol coexistence, comprising:
   determining, within a frequency band of a wireless local area network (WLAN) by a device configured for operation in at least a non-WLAN protocol, one or more addresses of one or more WLAN devices operating within the frequency band;
   sending, by the device, to each of the one or more addresses, a request for a response to the request;
   checking, by the device, if the device has received the response to each request sent to the one or more addresses;
   transmitting, by the device, a message in WLAN protocol if the device has received the response to each request sent to the one or more addresses, the message having a receiver address other than the one or more addresses of the one or more WLAN devices; and
   delaying, by the device, the transmission of the message in WLAN protocol if the device has not received the response to each request sent to the one or more addresses, by repeating the checking intermittently, or based on a schedule or a predefined delay, until the device has received the response to each request sent to the one or more addresses.

19. The method of claim 18, wherein the receiver address comprises at least one of: an address of the non-WLAN device, an address with a local bit that is set, or a value other than an address of any device.

20. The method of claim 18, comprising transmitting a message in a non-WLAN protocol, after transmitting the message in WLAN protocol.

* * * * *